(12) United States Patent
Han et al.

(10) Patent No.: US 9,671,636 B2
(45) Date of Patent: Jun. 6, 2017

(54) LIQUID CRYSTAL DISPLAY AND METHOD FOR MANUFACTURING THE SAME

(71) Applicant: Samsung Display Co., Ltd, Yongin-si, Gyeonggi-do (KR)

(72) Inventors: Eun Hee Han, Seoul (KR); Ho Yun Byun, Osan-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/966,763

(22) Filed: Dec. 11, 2015

(65) Prior Publication Data

US 2016/0291393 A1    Oct. 6, 2016

(30) Foreign Application Priority Data

Apr. 2, 2015 (KR) .................. 10-2015-0046780

(51) Int. Cl.
*G02F 1/1333* (2006.01)
*G02F 1/1335* (2006.01)
(Continued)

(52) U.S. Cl.
CPC ...... *G02F 1/133377* (2013.01); *G02F 1/1341* (2013.01); *G02F 1/13439* (2013.01);
(Continued)

(58) Field of Classification Search
CPC ............. G02F 1/133377; G02F 1/1341; G02F 1/133514; G02F 2201/52; G02F 2001/136222; G02F 1/133516; G02F 1/13439; G02F 1/133512; G02F 1/1343; G02F 1/134336; G09G 3/2003;
(Continued)

(56) References Cited

U.S. PATENT DOCUMENTS

| | | | | |
|---|---|---|---|---|
| 2009/0147186 A1* | 6/2009 | Nakai | ................. | G02F 1/13471 349/74 |
| 2012/0062448 A1* | 3/2012 | Kim | .................. | G02F 1/133377 345/55 |
| 2013/0093985 A1* | 4/2013 | Kang | ................ | G02F 1/133377 349/106 |

FOREIGN PATENT DOCUMENTS

| KR | 10-2007-0059694 A | 6/2007 |
|---|---|---|
| KR | 10-2012-0017672 A | 2/2012 |
| KR | 10-2012-0026880 A | 3/2012 |

OTHER PUBLICATIONS

Heide, "Cascaded Displays: Spatiotemporal Superresolution Using Offset Pixel Layers", NVIDIA Research, date unknown, 11 pp.

* cited by examiner

*Primary Examiner* — Paul Lee
*Assistant Examiner* — Jia Pan
(74) *Attorney, Agent, or Firm* — Innovation Counsel LLP

(57) ABSTRACT

Provided is a liquid crystal display. An exemplary embodiment of the present disclosure provides a liquid crystal display including a first substrate, a thin film transistor located on the first substrate, a pixel electrode located on the thin film transistor, a first roof layer that faces the pixel electrode and is formed of a first color filter layer, a capping layer located on the first roof layer; and a second roof layer that is located on the capping layer and is formed of a second color filter layer, in which a plurality of first microcavities is formed between the pixel electrode and the first roof layer, and the plurality of first microcavities forms a first liquid crystal layer that includes a liquid crystal molecule, and a plurality of second microcavities is formed between the second roof layer and a second substrate that is located on the second roof layer.

11 Claims, 12 Drawing Sheets

(51) Int. Cl.
*G02F 1/1341* (2006.01)
*G02F 1/1343* (2006.01)
*G02F 1/1362* (2006.01)

(52) U.S. Cl.
CPC .. *G02F 1/133512* (2013.01); *G02F 1/133514* (2013.01); *G02F 1/133516* (2013.01); *G02F 1/134336* (2013.01); *G02F 1/136286* (2013.01); *G02F 2201/52* (2013.01)

(58) Field of Classification Search
CPC ......... G09G 2300/0452; G09G 3/3607; G09G 3/3611; G09G 5/02; G02B 5/201; H01L 27/322; H01L 27/3213
See application file for complete search history.

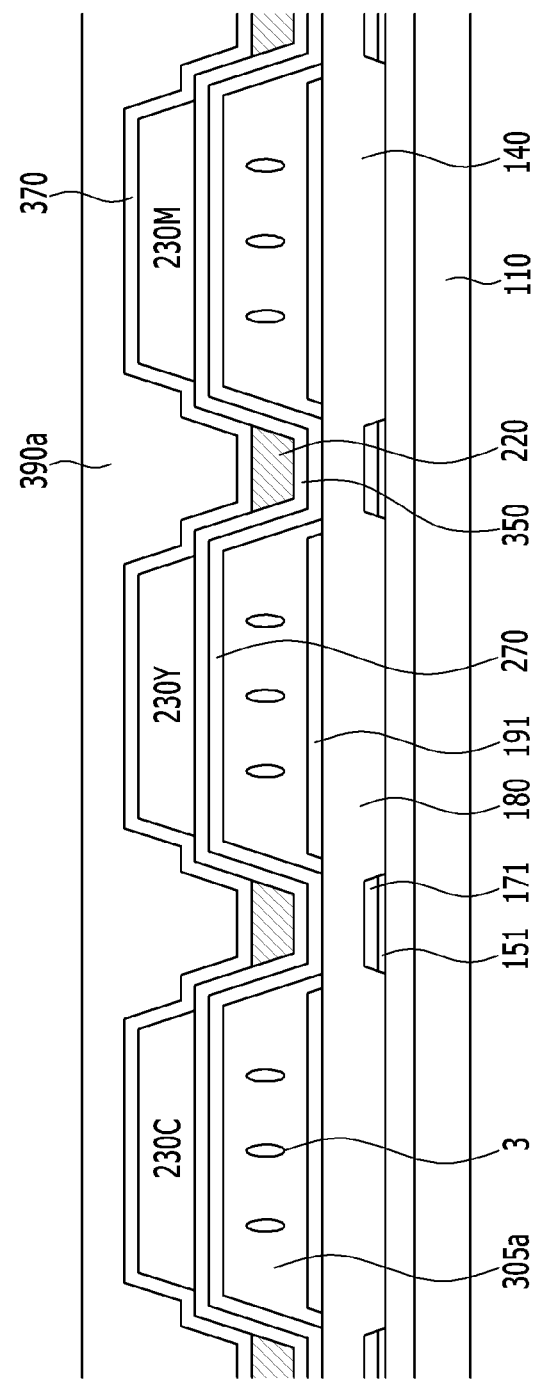

LIQUID CRYSTAL DISPLAY AND METHOD FOR MANUFACTURING THE SAME

CROSS-REFERENCE TO RELATED APPLICATION

This application claims priority to and the benefit of Korean Patent Application No. 10-2015-0046780 filed in the Korean Intellectual Property Office on Apr. 2, 2015, the entire contents of which are incorporated herein by reference.

BACKGROUND (a) Field of the Disclosure

The present disclosure relates to a liquid crystal display and a method for manufacturing the same.

(b) Description of the Related Art

A liquid crystal display is a common type of flat panel display currently in use and generally includes two sheets of display panels with field generating electrodes, such as a pixel electrode and a common electrode, formed thereon, and a liquid crystal layer interposed therebetween. The liquid crystal display generates electric fields in the liquid crystal layer by applying a voltage to the field generating electrodes. The generated electric fields determine the direction of liquid crystal molecules of the liquid crystal layer and thereby control the polarization of incident light so as to display images.

The two sheets of display panels forming the liquid crystal display may be configured by a thin film transistor display panel and an opposing display panel. In the thin film transistor display panel, a gate line configured to transmit a gate signal and a data line configured to transmit a data signal may be formed to intersect each other, and a thin film transistor connected to the gate line and the data line and a pixel electrode connected to the thin film transistor may be formed. In the opposing display panel, a light blocking member, a color filter, and a common electrode are formed. In some cases, the light blocking member, the color filter, and the common electrode may be formed in the thin film transistor display panel.

However, when two substrates are used, and each of the constituent elements is formed on the two substrates, the display device is heavy and thick, and high costs and long processing times are consumed.

The above information disclosed in this Background section is only for enhancement of understanding of the background of the disclosure and therefore may contain information that does not form the prior art that is already known in this country to a person of ordinary skill in the art.

SUMMARY

The present disclosure provides a liquid crystal display that has a reduced thickness and an improved resolution and a method for manufacturing the same.

An exemplary embodiment of the present disclosure provides a liquid crystal display including: a first substrate, a thin film transistor located on the first substrate, a pixel electrode located on the thin film transistor, a first roof layer that faces the pixel electrode and is formed of a first color filter layer, a capping layer located on the first roof layer; and a second roof layer that is located on the capping layer and is formed of a second color filter layer, in which a plurality of first microcavities is formed between the pixel electrode and the first roof layer, and the plurality of first microcavities forms a first liquid crystal layer that includes a liquid crystal molecule, and a plurality of second microcavities is formed between the second roof layer and a second substrate that is located on the second roof layer.

The first microcavities and the second microcavities may be disposed to be off-centered from each other.

The first color filter layer may include a first pixel, a second pixel, and a third pixel that are adjacent to each other along a direction of a gate line that is connected to the thin film transistor, and the second color filter layer may include a fourth pixel, a fifth pixel, and a sixth pixel.

The plurality of pixels may be any one of a cyan pixel, a yellow pixel, and a magenta pixel, and the first pixel and the sixth pixel, the second pixel and the fourth pixel, and the third pixel and the fifth pixel may have the same color pixel.

The plurality of pixels may be arranged in a matrix, and the second color filter layer may be disposed so as to be off-centered by an interval of ½ pixel in a matrix direction of the first color filter layer.

The plurality of pixels may be arranged in a matrix, and the second color filter layer may be disposed to be off-centered by an interval of ½ pixel in a row direction of the first color filter layer.

The first microcavities and the second microcavities may include a plurality of regions corresponding to a pixel area, and the liquid crystal display may further include a light blocking member that is located between the plurality of regions.

The plurality of second microcavities may further include a second liquid crystal layer including a liquid crystal molecule.

The first color filter layer may include a first pixel, a second pixel, and a third pixel that are adjacent to each other along a direction of a gate line that is connected to the thin film transistor, and the second color filter layer may include a fourth pixel, a fifth pixel, and a sixth pixel.

The plurality of pixels may be any one of a red pixel, a green pixel, and a blue pixel, and the first pixel and the fourth pixel, the second pixel and the fifth pixel, and the third pixel and the sixth pixel may have the same color pixel.

The plurality of pixels may be arranged in a matrix, and the second color filter layer may be disposed so as to be off-centered by an interval of ½ pixel in a column direction of the first color filter layer.

Another exemplary embodiment of the present disclosure provides a manufacturing method of a liquid crystal display, comprising:

manufacturing a first liquid crystal display by: forming a thin film transistor on a first substrate, forming a pixel electrode to be connected to one terminal of the thin film transistor, forming a sacrificial layer on the pixel electrode, forming a first roof layer that is formed of a first color filter on the sacrificial layer, forming a first microcavity in which a liquid crystal injection hole is formed, by removing the sacrificial layer, forming a first liquid crystal layer by injecting a liquid crystal material into the microcavity, and forming a first capping layer on the first color filter; manufacturing a second liquid crystal display by: forming a thin film transistor on a second substrate, forming a pixel electrode to be connected to one terminal of the thin film transistor, forming a sacrificial layer on the pixel electrode, forming a second roof layer that is formed of a second color filter on the sacrificial layer, forming a second microcavity in which a liquid crystal injection hole is formed, by removing the sacrificial layer, forming a second liquid crystal layer by injecting a liquid crystal material into the microcavity, and forming a second capping layer on the second color filter; and bonding the first capping layer and the second capping layer.

The first microcavities and the second microcavities may be disposed to be off-centered from each other.

The first color filter layer may include a first pixel, a second pixel, and a third pixel that are adjacent to each other along a direction of a gate line that is connected to the thin film transistor, and the second color filter layer may include a fourth pixel, a fifth pixel, and a sixth pixel.

The plurality of pixels may be any one of a cyan pixel, a yellow pixel, and a magenta pixel, and the first pixel and the sixth pixel, the second pixel and the fourth pixel, and the third pixel and the fifth pixel may have the same color pixel.

The plurality of pixels may be arranged in a matrix, and the second color filter layer may be disposed so as to be off-centered by an interval of ½ pixel in a matrix direction of the first color filter layer.

The first microcavities and the second microcavities may include a plurality of regions corresponding to a pixel area, and the manufacturing method may further include forming a light blocking member that is located between the plurality of regions.

As described, according to the exemplary embodiment of the present disclosure, two liquid crystal displays are formed without having a separate upper panel and are bonded together to provide a liquid crystal display that may implement high resolution by a plurality of color filter layers while having a reduced thickness and weight.

BRIEF DESCRIPTION OF THE DRAWINGS

FIGS. 8, 9, 10, 11 and 12 are cross-sectional views illustrating a method for manufacturing a liquid crystal display according to an exemplary embodiment of the present disclosure.

DETAILED DESCRIPTION OF THE EMBODIMENTS

Figure 1:
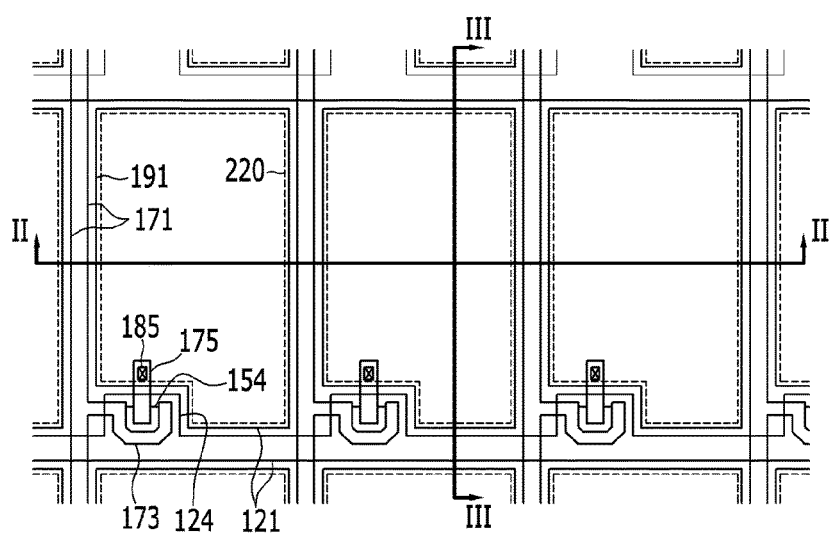
FIG. 1 is a top plan view illustrating a liquid crystal display according to an exemplary embodiment of the present disclosure.

Exemplary embodiments of the present disclosure are described more fully hereinafter with reference to the accompanying drawings. As those skilled in the art would realize, the described embodiments may be modified in various different ways, all without departing from the spirit or scope of the present disclosure. Rather, the exemplary embodiments introduced herein are provided to sufficiently transfer the spirit of the present disclosure to those skilled in the art.

In the drawings, the thickness of layers, films, panels, regions, etc., are exaggerated for clarity. It will be understood that when a layer is referred to as being "on" another layer or substrate, it may be directly on the other layer or substrate, or intervening them may also be present. Like reference numerals designate like elements throughout the specification.

Figure 2:
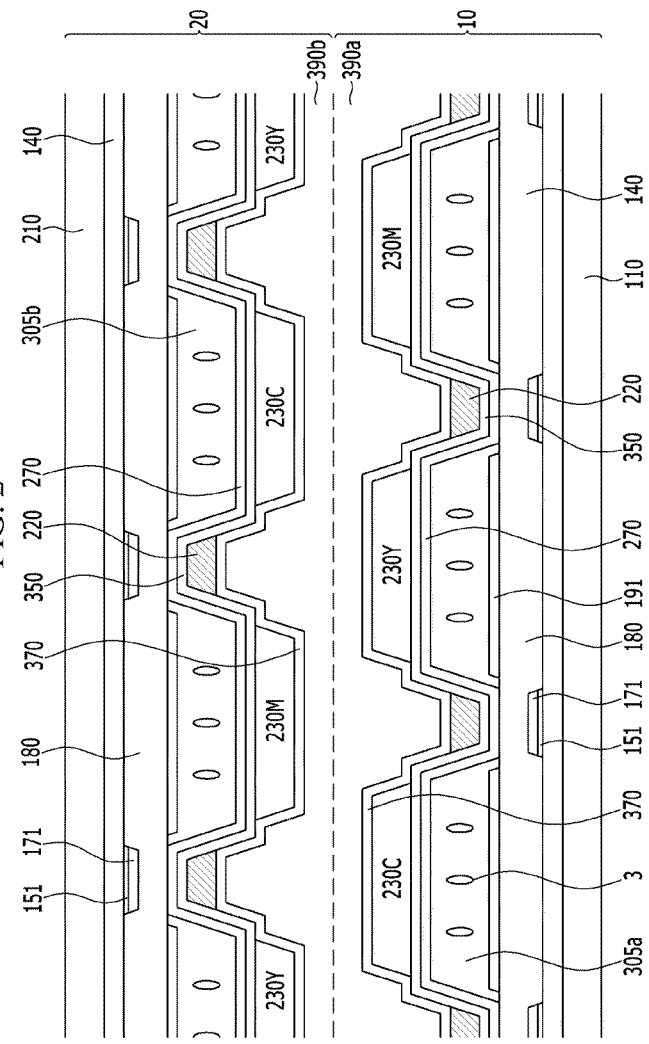
FIG. 2 is a cross-sectional view taken along the cut line II-II of FIG. 1.
Figure 3:
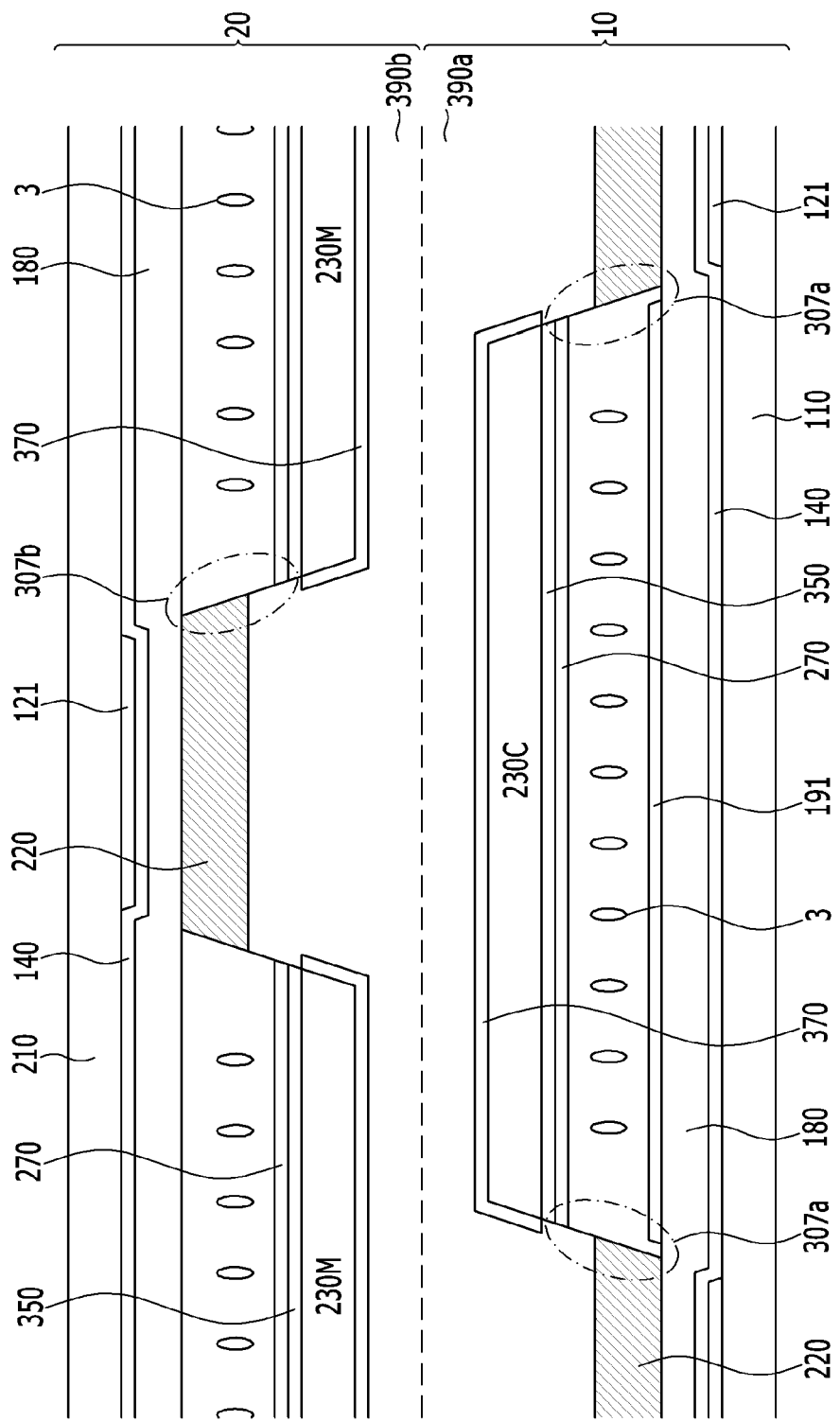
FIG. 3 is a cross-sectional view taken along the cut line III-III of FIG. 1.

FIG. 1 is a top plan view illustrating a liquid crystal display according to a first exemplary embodiment of the present disclosure. FIG. 2 is a cross-sectional view taken along the cut line II-II of FIG. 1. FIG. 3 is a cross-sectional view taken along the cut line III-III of FIG. 1.

First, a first substrate 110 that is a lower panel is described with reference to FIGS. 1 to 3. A plurality of gate lines 121 is formed on the first substrate 110, which may be formed of a transparent glass or plastic.

The gate line 121 is configured to transmit a gate signal and extends mainly in a horizontal direction. Each gate line 121 includes a plurality of gate electrodes 124 that protrudes from the gate line 121.

The gate line 121 and the gate electrode 124 may be formed of at least one selected from a group consisting of an aluminum-based metal such as aluminum (Al) and an aluminum alloy, a silver-based metal such as silver (Ag) and a silver alloy, and a copper-based metal such as copper (Cu) and a copper alloy.

In the present exemplary embodiment, although it is described that the gate line 121 and the gate electrode 124 are formed to be a single layer, the gate line 121 and the gate electrode 124 are not limited thereto and may be formed to have a dual-layer structure or a triple-layer structure.

When the gate line 121 and the gate electrode 124 have a dual-layer structure, the gate line 121 and the gate electrode 124 may be formed with a lower layer and an upper layer, and the lower layer may be formed of at least one selected from a group consisting of a molybdenum-based metal such as molybdenum (Mo) and a molybdenum alloy, chromium (Cr), a chromium alloy, titanium (Ti), a titanium alloy, tantalum (Ta), a tantalum alloy, manganese (Mn), and a manganese alloy. The upper layer may be formed of at least one selected from a group consisting of an aluminum-based metal such as aluminum (Al) and an aluminum alloy, a silver-based metal such as silver (Ag) and a silver alloy, and a copper-based metal such as copper (Cu) and a copper alloy. When the gate line 121 and the gate electrode 124 have a triple-layer structure, layers having different physical properties are combined to form the gate line 121 and the gate electrode 124.

A gate insulating layer 140 is formed on the gate line 121.

A semiconductor layer 151 is formed on the gate insulating layer 140. The semiconductor layer 151 extends mainly in a vertical direction and includes a plurality of projections 154 that extends toward the gate electrode 124.

A data line 171 and a drain electrode 175 which are connected to source electrodes 173 are formed on the semiconductor layer 151.

The data line 171 is configured to transmit a data signal and extends mainly in a vertical direction to intersect the gate line 121. Each data line 171 is connected to a plurality of source electrodes 173 that extends toward the gate electrode 124 and has a U shape.

The drain electrode 175 is separated from the data line 171 and extends toward an upper portion from a center of the U shape of the source electrode 173. Such shapes of the source electrode 173 and the drain electrode 175 are examples and may be modified in various ways.

Data wire layers 171, 173, and 175 including the data line 171, the source electrode 173, and the drain electrode 175 may be formed of at least one selected from a group consisting of an aluminum-based metal such as aluminum (Al) and an aluminum alloy, a silver-based metal such as silver (Ag) and a silver alloy, and a copper-based metal such as copper (Cu) and a copper alloy.

In the present exemplary embodiment, although it is described that the data line 171, the source electrode 173, and the drain electrode 175 are formed to be a single layer, the data line 171, the source electrode 173, and the drain electrode 175 are not limited thereto and may be formed to have a dual-layer structure or a triple-layer structure.

When the data line 171, the source electrode 173, and the drain electrode 175 have a dual-layer structure, the data line 171, the source electrode 173, and the drain electrode 175 may be formed with a lower layer and an upper layer. The lower layer may be formed of at least one selected from a group consisting of a molybdenum-based metal such as molybdenum (Mo) and a molybdenum alloy, chromium (Cr), a chromium alloy, titanium (Ti), a titanium alloy, tantalum (Ta), a tantalum alloy, manganese (Mn), and a manganese alloy, and the upper layer may be formed of at least one selected from a group consisting of an aluminum-based metal such as aluminum (Al) and an aluminum alloy, a silver-based metal such as silver (Ag) and a silver alloy, and a copper-based metal such as copper (Cu) and a copper alloy. When the data line 171, the source electrode 173, and the drain electrode 175 have a triple-layer structure, layers having different physical properties may be combined to form the data line 171, the source electrode 173, and the drain electrode 175.

A part of the projection 154 of the semiconductor layer is exposed between the source electrode 173 and the drain electrode 175 without being blocked by the data line 171 and the drain electrode 175. Except for the exposed portion of the projection 154 of the semiconductor layer, the projection 154 has the substantially same plane pattern as the data line 171, the source electrode 173, and the drain electrode 175. In other words, side walls of the data line 171, the source electrode 173, and the drain electrode 175 may be substantially aligned with side walls of the semiconductor layer therebelow. Such a pattern is formed because the data wire layers 171, 173, and 175 including the data line 171, the source electrode 173, and the drain electrode 175 use the same mask as the semiconductor layer.

One gate electrode 124, one source electrode 173, and one drain electrode 175 form one thin film transistor (TFT) together with the projection 154 of the semiconductor layer 151, and a channel of the thin film transistor is formed in the projection 154 between the source electrode 173 and the drain electrode 175.

A passivation layer 180 is located on the data line 171, the drain electrode 175, and the exposed portion of the projection 154 of the semiconductor layer. The passivation layer 180 is formed of an inorganic insulator such as silicon nitride or silicon oxide, an organic insulator, or an insulator having a low permittivity.

A plurality of pixel electrodes 191 is located on the passivation layer 180. The pixel electrode 191 is physically and electrically connected to the drain electrode 175 through a contact hole 185 that passes through the passivation layer 180 and is applied with a data voltage from the drain electrode 175. The pixel electrode 191 may be formed of a transparent conductor such as ITO or IZO.

Although not illustrated, the pixel electrode 191 may be formed as a plurality of small electrodes or fine slit-shaped electrodes.

A lower alignment layer (not illustrated) may be formed on the pixel electrode 191 and may be a vertical alignment layer. The lower alignment layer may include at least one of materials that are generally used as a liquid crystal alignment layer, such as polyamic acid, polysiloxane or polyimide.

A first microcavity 305a is located on the lower alignment layer. A liquid crystal material including liquid crystal molecules 3 is injected into the first microcavity 305a through a first liquid crystal injection hole 307a. The first microcavity 305a may be formed along a column direction of the pixel electrode 191. In the present exemplary embodiment, the liquid crystal material is injected into the first microcavity 305a using capillary force, and the first microcavity 305a into which the liquid crystal material is injected forms a first liquid crystal layer.

A plurality of regions of the first microcavity 305a may be located along the vertical direction, and the first liquid crystal injection hole 307a may also be formed along a direction in which the data line 171 extends.

An upper alignment layer (not illustrated) may be located on the first microcavity 305a, and a common electrode 270 and the lower insulating layer 350 may be located on the upper alignment layer. The common electrode 270 is applied with a common voltage and generates an electric field together with the pixel electrode 191, which is applied with a data voltage to determine a direction of inclined liquid crystal molecules 3 located in the first microcavity 305a between the two electrodes. The common electrode 270 forms a capacitor together with the pixel electrode 191 so that an applied voltage is maintained for a period of time even after the thin film transistor is turned off. The lower insulating layer 350 may be formed of silicon nitride (SiNx) or silicon oxide ($SiO_2$).

In the present exemplary embodiment, although it is described that the common electrode 270 is formed on the first microcavity 305a, according to another exemplary embodiment, the common electrode 270 is formed below the first microcavity 305a to drive a liquid crystal in accordance with a coplanar electrode (CE) mode.

As illustrated in FIG. 2, the first microcavity 305a may also be divided into a plurality of regions along the horizontal direction. The first microcavity 305a is enclosed by the common electrode 270 and the lower insulating layer 350, and a light blocking member 220 is located between a plurality of first microcavities 305a that are adjacent to each other along a direction in which the gate line extends. In this case, the light blocking member 220 may be formed to have a height that is approximately a one third of a height of the first microcavity 305a.

The light blocking member 220, which may be referred to as a black matrix, prevents light leakage. Here, the light blocking member 220 includes a portion formed along a direction in which the data line 171 extends and a portion formed along a direction in which the gate line 121 extends, as illustrated in FIG. 3. Further, the light blocking member 220 is located in a portion from which the pixel area is substantially excluded.

A first color filter layer C, Y, M is located on the common electrode 270 and the lower insulating layer 350. In the present exemplary embodiment, the first color filter C, Y, M is a first roof layer and protects the first microcavity 305a from an external pressure. The first color filter layer C, Y, M includes a first pixel 230C, a second pixel 230Y, and a third pixel 230M along a direction of the gate line 121 that is connected to the thin film transistor.

Specifically, the first pixel 230C, the second pixel 230Y, and the third pixel 230M illustrated in FIG. 2 transmit light having cyan, yellow, and magenta colors, respectively.

An upper insulating layer 370 is located on the first color filter layer C, Y, M. The upper insulating layer 370 may cover over the first color filter layer C, Y, M and the light blocking member 220.

A first capping layer 390a is located on the upper insulating layer 370. The first capping layer 390a covers the first liquid crystal injection hole 307a through which the microcavity 305 may be exposed and may be formed of a thermosetting resin, silicon oxycarbide (SiOC) or graphene.

Hereinafter, the second substrate 210 is described.

A second capping layer 390b is located on the first capping layer 390a. The second capping layer 390b may be formed of the same or different material as the first capping layer 390a.

The upper insulating layer 370 and a second color filter layer Y, M, C is sequentially located on the second capping layer 390b. In the present exemplary embodiment, the second color filter layer Y, M, C is a second roof layer and protects the second microcavity 305b from an external pressure.

The second color filter layer Y, M, C includes a fourth pixel 230Y, a fifth pixel 230M, and a sixth pixel 230C along a direction of the gate line 121 that is connected to the thin film transistor.

Specifically, the fourth pixel 230Y, the fifth pixel 230M, and the sixth pixel 230C illustrated in FIG. 2 transmit light having yellow, cyan, and magenta colors, respectively.

In the exemplary embodiment of the present disclosure, the second color filter layer is disposed to be off-centered by an interval of ½ pixel from the first color filter layer in a matrix direction. The liquid crystal display that includes the plurality of color filter layers may finally display one of three primary colors such as green, blue, and red. In accordance with a color to be finally represented, the color arrangement of the first pixel, the second pixel, the third pixel, the fourth pixel, the fifth pixel, and the sixth pixel may vary. An interval at which the first color filter layer is off-centered from the second color filter layer is not limited to the interval of ½ pixel described above but may be modified.

Figure 4:
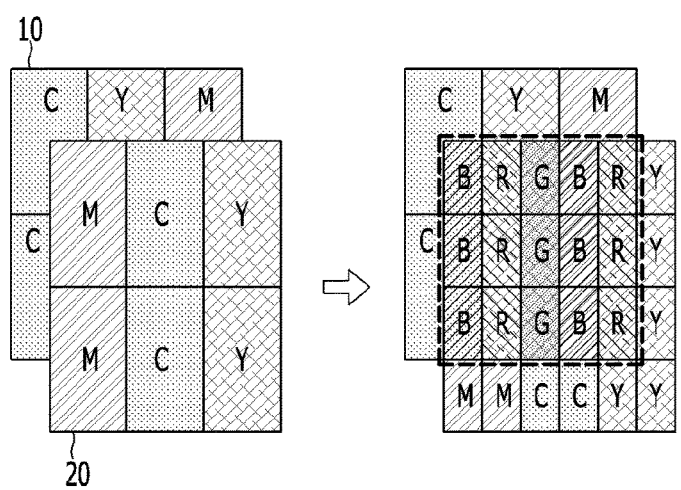
FIGS. 4, 5 and 6 are views of arrangement of a first color filter layer and a second color filter layer according to an exemplary embodiment of the present disclosure.
Figure 5:
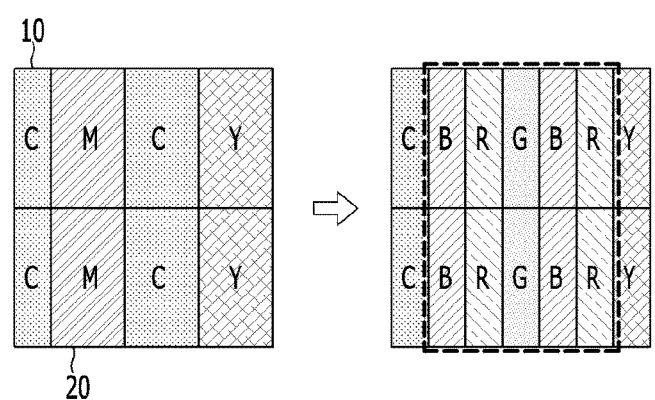
Figure 6:
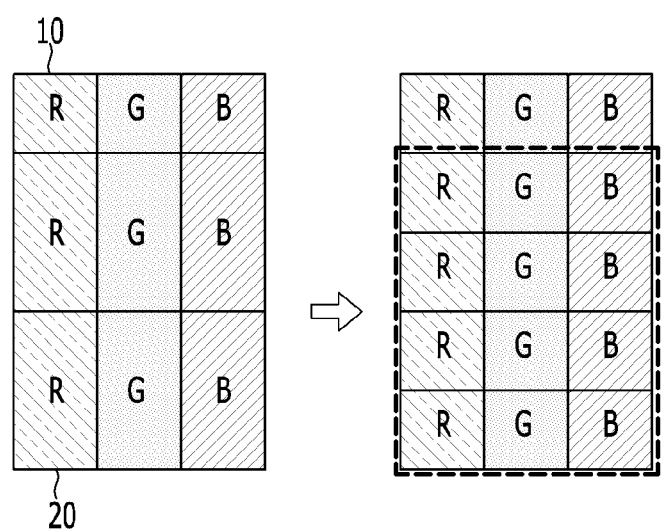

FIGS. 4 to 6 are views of arrangement of a first color filter layer and a second color filter layer according to an exemplary embodiment of the present disclosure.

First, referring to FIG. 4, a first liquid crystal display 10 having a first color filter layer and a second liquid crystal display 20 having a second color filter layer are disposed to be offset by the interval of ½ pixel in a diagonal matrix direction (i.e., offset in both row and column direction). That is, the liquid crystal display according to the exemplary embodiment of the present disclosure has a resolution that is up to four times higher than a resolution of a liquid crystal display of the related art that includes one color filter layer.

In FIGS. 5 and 6, the first liquid crystal display 10 having a first color filter layer and the second liquid crystal display 20 having a second color filter layer are disposed to be offset by the interval of ½ pixel in a row and column matrix direction, respectively. Therefore, a liquid crystal display that has up to two times the better resolution in the row or column matrix direction may be provided.

As illustrated in FIG. 6, when the resolution is increased in a column direction, the first color filter layer and the second color filter layer may be formed to be configured by one of three primary colors of green, blue, and red.

Figure 7:
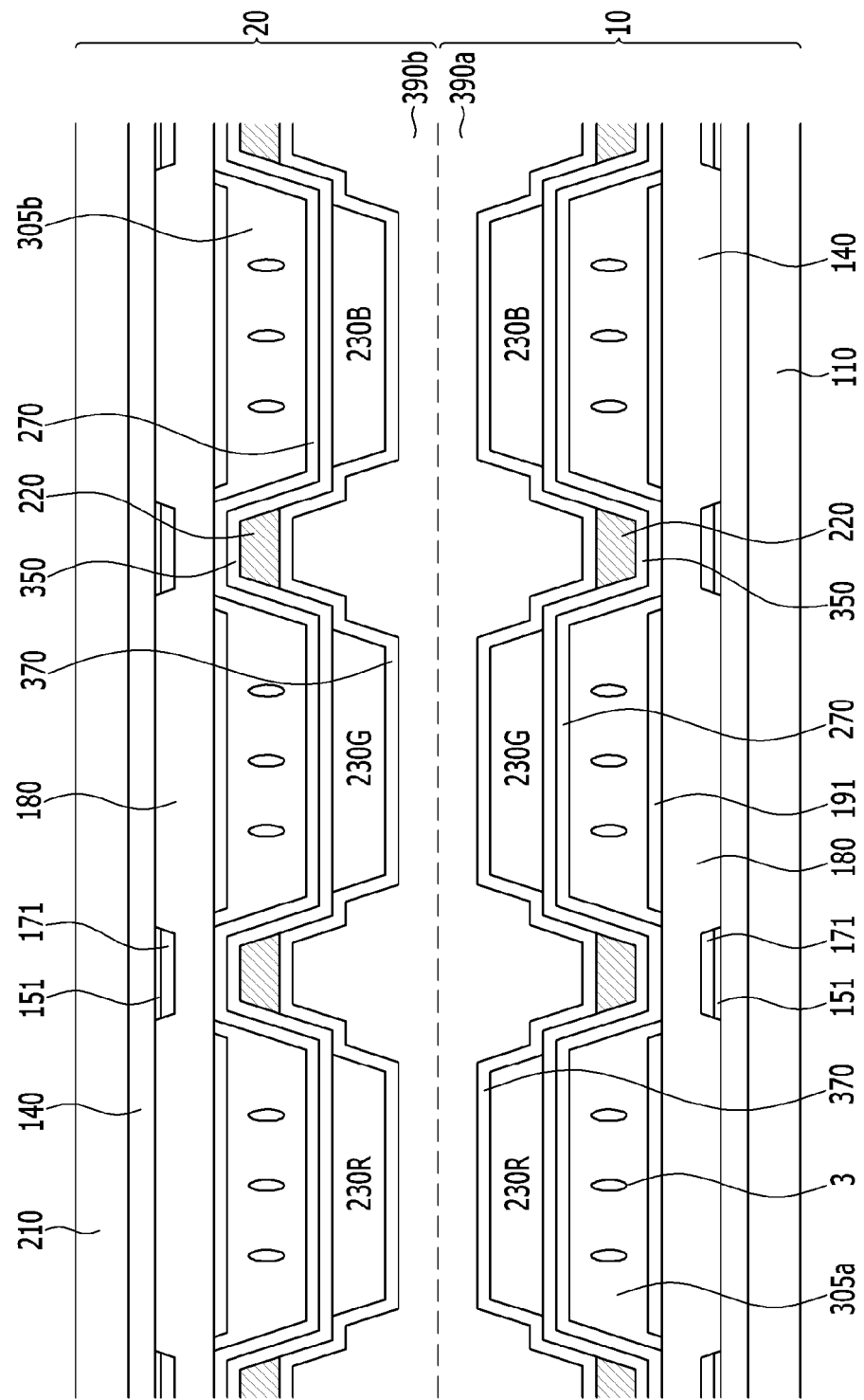
FIG. 7 is a cross-sectional view of a liquid crystal display according to another exemplary embodiment of the present disclosure.

A cross-sectional view of the liquid crystal display having an arrangement of the first color filter layer and the second color filter layer as illustrated in FIG. 6 is illustrated in FIG. 7. The liquid crystal display has the same configuration and the same effect as the liquid crystal display according to the above-described exemplary embodiment except for a difference of the arrangement of the first color filter layer and the second color filter layer.

In a liquid crystal display according to another exemplary embodiment of the present disclosure, a field sequential color (FSC) driving method may be applied.

In this case, the first microcavity and the second microcavity are disposed to be off-centered by an interval of ½ pixel in the matrix direction without providing the first color filter layer and the second color filter layer.

The field sequential color (hereinafter, abbreviated as FSC) driving method is a driving method that displays color without using a color filter. Specifically, the FSC driving method displays mixed color using a residual image effect that occurs in the eyes of a human being by sequentially driving LEDs of three primary colors (red, green and blue). More specifically, the time for displaying one frame by the display panel is divided into three times for displaying colors of red, green, and blue, and each back light is sequentially illuminated with an interval of time. A field sequential color (FSC) driving method that uses an LED as a back light unit generally achieves a better image quality.

The common electrode 270, the lower insulating layer 350, and the second microcavity 305b are sequentially located on the second color filter layer. The common electrode 270 is applied with a common voltage and generates an electric field together with the pixel electrode 191 that is applied with a data voltage to determine a direction of inclined liquid crystal molecules 3 located in the second microcavity 305b between the two electrodes. The common electrode 270 forms a capacitor together with the pixel electrode 191 so that an applied voltage is maintained even after the thin film transistor is turned off.

A liquid crystal material including the liquid crystal molecules 3 is injected into the second microcavity 305b through a second liquid crystal injection hole 307b. The liquid crystal material is injected into the second microcavity 305b along a column direction of the pixel electrode 191, and the second microcavity 305b into which the liquid crystal material is injected forms a second liquid crystal layer.

A plurality of regions of the second microcavity 305b may be located along the vertical direction, and the second liquid crystal injection hole 307b may also be formed along a direction in which the data line 171 extends. The data line 171 is configured to transmit a data signal and extends mainly in the vertical direction to intersect the gate line 121. Each data line 171 is connected to a plurality of source electrodes 173 that extends toward the gate electrode 124 and has a U shape.

A semiconductor layer 151 is formed on the data line 171 and the drain electrode 175, which are connected to the source electrodes 173. The semiconductor layer 151 extends mainly in a vertical direction and includes a plurality of projections 154 that extends toward the gate electrode 124.

A gate insulating layer 140 is formed on the semiconductor layer 151.

A second substrate 210, which may be formed of a transparent glass or plastic, is formed on the gate insulating layer 140.

That is, in the liquid crystal display according to the exemplary embodiment of the present disclosure, except for an arrangement of the first color filter layer and the second color filter layer, the same technical configuration may be symmetrically formed with respect to the capping layers 390a and 390b.

FIGS. 8 to 12 are cross-sectional views illustrating a method for manufacturing a liquid crystal display according to an exemplary embodiment of the present disclosure.

Figure 8:
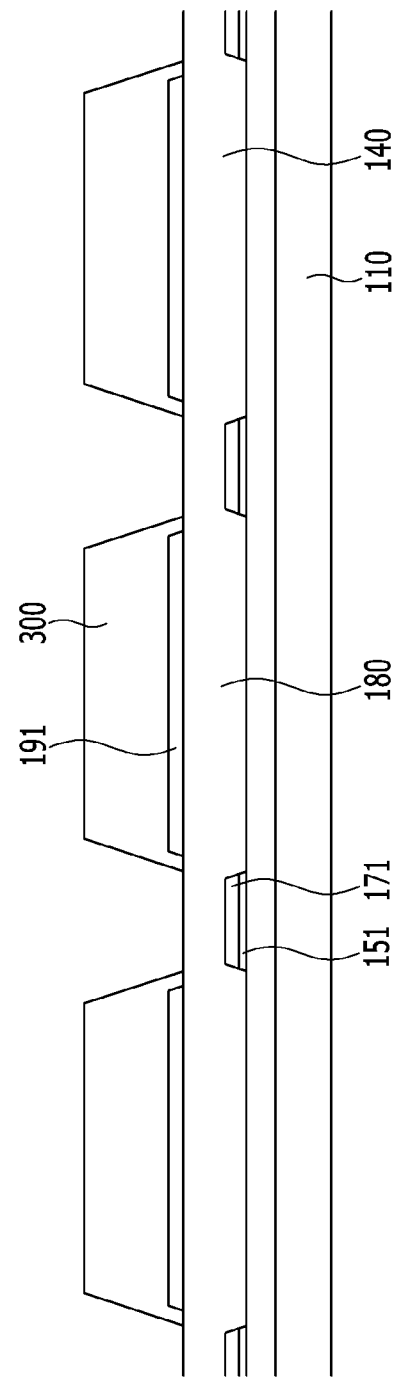

Referring to FIG. 8, after forming a thin film transistor (not illustrated) on a first substrate 110, a pixel electrode 191 connected to one terminal of a thin film transistor is formed. A sacrificial layer 300 is formed on the pixel electrode 191.

The sacrificial layer 300 is exposed/developed or patterned to partially expose a passivation layer 180 along a direction in which a data line 171 extends. In this case, the sacrificial layer 300 may be divided into a plurality of regions along a direction in which a gate line 121 extends.

Figure 9:
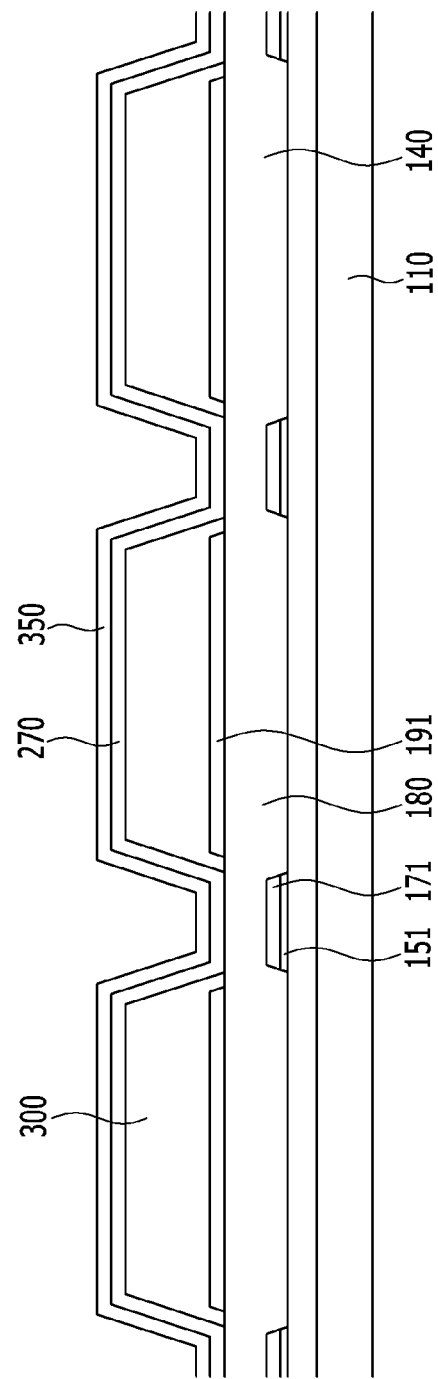

Referring to FIG. 9, a common electrode 270 and a lower insulating layer 350 are sequentially formed so as to cover the sacrificial layer 300 and the exposed passivation layer 180. The common electrode 270 may be formed of a transparent conductor, such as ITO or IZO, and the lower insulating layer 350 may be formed of silicon nitride (SiNx) or silicon oxide ($SiO_2$).

Figure 10:
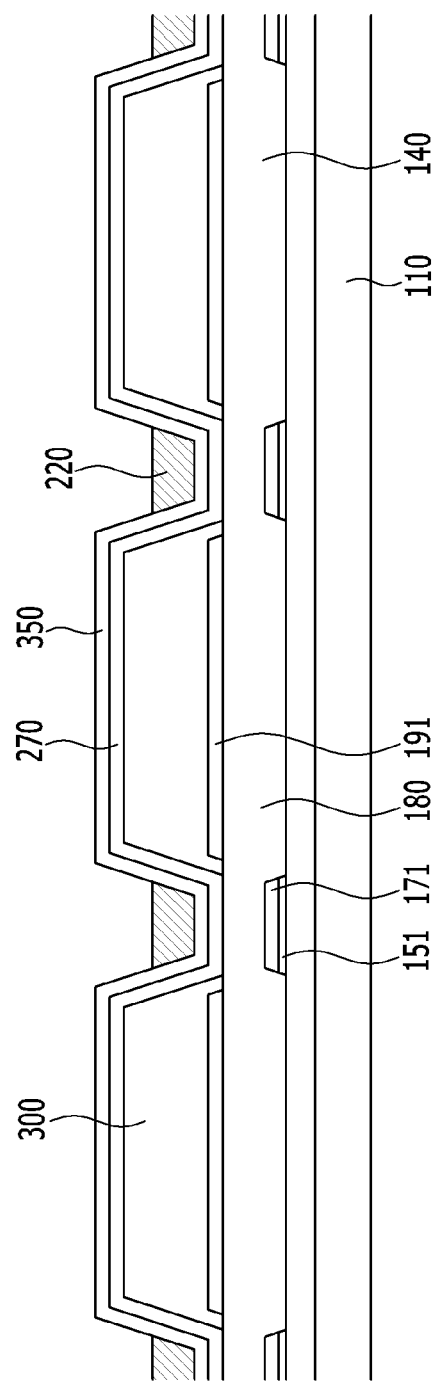

Referring to FIG. 10, a light blocking member 220 is formed between sacrificial layers 300 that are adjacent to each other along the direction in which the gate line 121 extends. In this case, the light blocking member 220 may be formed to have approximately a height that is one third of a height of the sacrificial layer 300.

Figure 11:
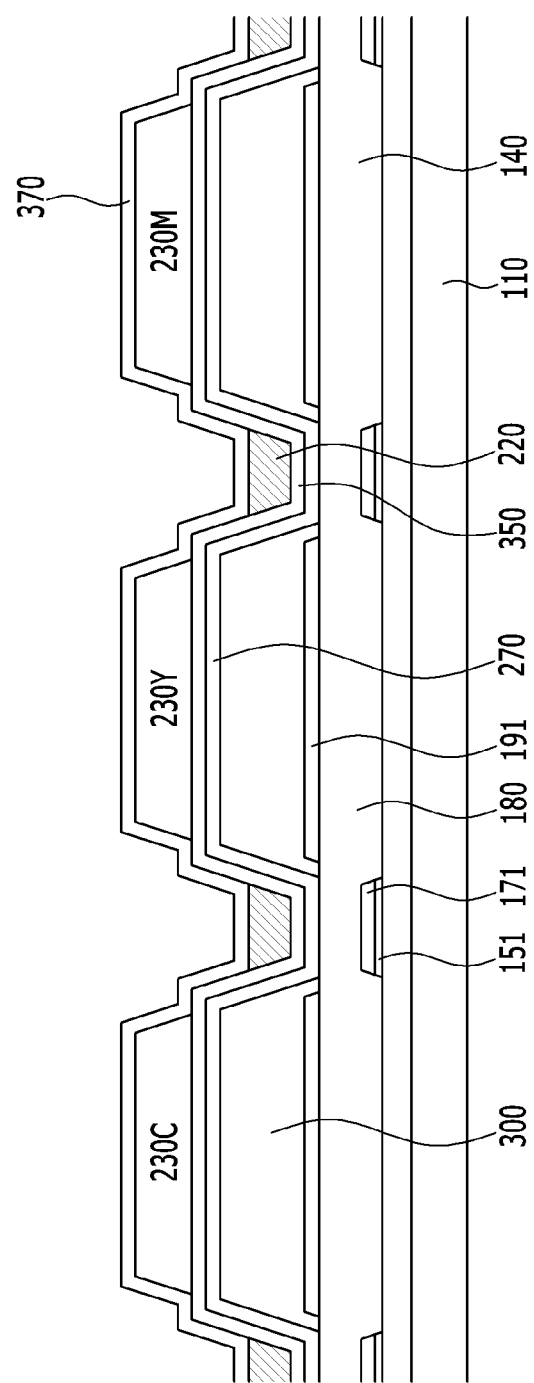

Referring to FIG. 11, a first color filter layer C, Y, M is formed on the common electrode 270. An upper insulating layer 370 is formed on the first color filter layer to cover the first color filter layer C, Y, M and the light blocking member 220.

Referring to FIGS. 2, 3, and 12, the sacrificial layer 300 is removed by an oxygen ($O_2$) ashing process or a wet etching method through the first liquid crystal injection hole 307a to form a first microcavity 305a. The sacrificial layer 300 is removed, so that the first microcavity 305a is an empty space. Thereafter, an alignment layer (not illustrated) is formed through the first liquid crystal injection hole 307a. After injecting an alignment material including a solid content and a solvent through the first liquid crystal injection hole 307a, a bake process is performed.

Next, a liquid crystal material including liquid crystal molecules 3 is injected into the microcavity 305a through the first liquid crystal injection hole 307a using an inkjet method.

Next, as illustrated in FIGS. 2 and 3, a first capping layer 390a is formed on the first color filter layer to cover between the first microcavities 305a, so that a first liquid crystal display 10 in which the liquid crystal injection hole 307a of the first microcavity 305a is covered, as illustrated in FIG. 12, may be formed.

Another second liquid crystal display 20 is formed in accordance with the above-described manufacturing method. The second liquid crystal display 20 has the same structure as the first liquid crystal display 10, except that the second color filter layer is disposed to be offset by an interval of ½ pixel from the first color filter layer of the first liquid crystal display 10.

A second capping layer 390b formed of the same material as the first capping layer 390a of the first liquid crystal display 10 is formed in the second liquid crystal display 20, and the first and second capping layers are bonded to form a liquid crystal display as illustrated in FIGS. 2 and 3.

That is, in the liquid crystal display according to the present exemplary embodiment, two liquid crystal displays are each formed without a separate upper panel and then bonded together to provide a liquid crystal display that may implement high resolution by a plurality of color filter layers while having a reduced thickness and a weight.

While the present system and method have been described in connection with exemplary embodiments, it is to be understood that the present system and method are not limited to the disclosed embodiments. On the contrary, the present system and method to cover various modifications and equivalent arrangements included within the spirit and scope of the appended claims.

What is claimed is:

1. A liquid crystal display, comprising:
   a first substrate;
   a thin film transistor located on the first substrate;
   a pixel electrode located on the thin film transistor;
   a first roof layer that faces the pixel electrode and is formed of a first color filter layer;
   a capping layer located on the first roof layer; and
   a second roof layer that is located on the capping layer and is formed of a second color filter layer,
   wherein a plurality of first microcavities is formed between the pixel electrode and the first roof layer, and the plurality of first microcavities forms a first liquid crystal layer that includes a liquid crystal molecule, and
   a plurality of second microcavities is formed between the second roof layer and a second substrate that is located on the second roof layer.

2. The liquid crystal display of claim 1, wherein:
   the first microcavities and the second microcavities are disposed to be off-centered from each other.

3. The liquid crystal display of claim 2, wherein:
   the first color filter layer includes a first pixel, a second pixel, and a third pixel that are adjacent to each other along a direction of a gate line that is connected to the thin film transistor, and
   the second color filter layer includes a fourth pixel, a fifth pixel, and a sixth pixel.

4. The liquid crystal display of claim 3, wherein:
   the plurality of pixels is any one of a cyan pixel, a yellow pixel, and a magenta pixel, and
   the first pixel and the sixth pixel, the second pixel and the fourth pixel, and the third pixel and the fifth pixel have the same color pixel.

5. The liquid crystal display of claim 4, wherein:
   the plurality of pixels is arranged in a matrix, and
   the second color filter layer is disposed so as to be off-centered by an interval of ½ pixel in a matrix direction of the first color filter layer.

6. The liquid crystal display of claim 4, wherein:
   the plurality of pixels is arranged in a matrix, and
   the second color filter layer is disposed to be off-centered by an interval of ½ pixel in a row direction of the first color filter layer.

7. The liquid crystal display of claim 4, wherein:
   the first microcavities and the second microcavities include a plurality of regions corresponding to a pixel area, and
   the liquid crystal display further includes a light blocking member that is located between the plurality of regions.

8. The liquid crystal display of claim 7, wherein:
   the plurality of second microcavities further includes a second liquid crystal layer including a liquid crystal molecule.

9. The liquid crystal display of claim 1, wherein:
   the first color filter layer includes a first pixel, a second pixel, and a third pixel that are adjacent to each other along a direction of a gate line that is connected to the thin film transistor, and the second color filter layer includes a fourth pixel, a fifth pixel, and a sixth pixel.

10. The liquid crystal display of claim 9, wherein:
the plurality of pixels is any one of a red pixel, a green pixel, and a blue pixel, and the first pixel and the fourth pixel, the second pixel and the fifth pixel, and the third pixel and the sixth pixel have the same color pixel.

11. The liquid crystal display of claim 10, wherein: the plurality of pixels is arranged in a matrix, and the second color filter layer is disposed so as to be off-centered by an interval of ½ pixel in a column direction of the first color filter layer.

* * * * *